(12) United States Patent  (10) Patent No.: US 7,573,636 B2
Boettcher  (45) Date of Patent: Aug. 11, 2009

(54) SYSTEMS FOR INFLUENCING LASER BEAM POLARIZATION

(75) Inventor: Christian Boettcher, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 396 days.

(21) Appl. No.: 11/483,405

(22) Filed: Jul. 7, 2006

(65) Prior Publication Data
US 2007/0024969 A1 Feb. 1, 2007

(30) Foreign Application Priority Data
Jul. 8, 2005 (EP) ................... 05014867

(51) Int. Cl.
G02B 5/04 (2006.01)
G02B 5/30 (2006.01)
G02B 27/28 (2006.01)

(52) U.S. Cl. ................ 359/487; 359/494; 359/857; 359/834

(58) Field of Classification Search ......... 359/402, 359/487, 494, 834, 857; 219/121.74; 372/16, 372/99, 100
See application file for complete search history.

(56) References Cited

U.S. PATENT DOCUMENTS 3,192,824 A * 7/1965 Rosenthal ............ 359/211
4,643,576 A * 2/1987 Kanoh et al. ............ 356/513
5,134,519 A * 7/1992 Abele et al. ............ 359/405
5,469,236 A * 11/1995 Roessel ............ 396/432
5,483,342 A * 1/1996 Rockwell ............ 356/491
5,596,594 A 1/1997 Egawa
5,637,243 A 6/1997 Sato et al.
5,640,412 A * 6/1997 Reed ............ 372/100
5,771,097 A * 6/1998 Kusunose et al. ............ 356/520
5,867,513 A 2/1999 Sato
5,878,067 A 3/1999 Egawa
6,020,992 A * 2/2000 Georgiev et al. ............ 359/359
6,115,126 A * 9/2000 Chen et al. ............ 356/520
6,342,981 B1 1/2002 Stiens et al.

FOREIGN PATENT DOCUMENTS

DE 31 49 044 10/1982
DE 31 49 004 6/1983
DE 44 34 504 3/1995
EP 0 695 599 2/1996
EP 0 818 857 1/1998

* cited by examiner

Primary Examiner—Ricky D Shafer
(74) Attorney, Agent, or Firm—Fish & Richardson P.C.

(57) ABSTRACT

The invention relates to a device (1) for influencing the polarization of laser radiation using a phase-shifting element (5) and an element (7) deflecting the laser radiation. The phase-shifting element (5) is disposed in the region of an outer side (4) of a first partial body (2) and the deflecting element t(7) is disposed in the region of an outer side (6) of a second partial body (3), wherein the first partial body (2) and the second partial body (3) can be rotated about a common axis of rotation (14) through an angle of rotation ($\alpha$) which can be predetermined.

5 Claims, 3 Drawing Sheets

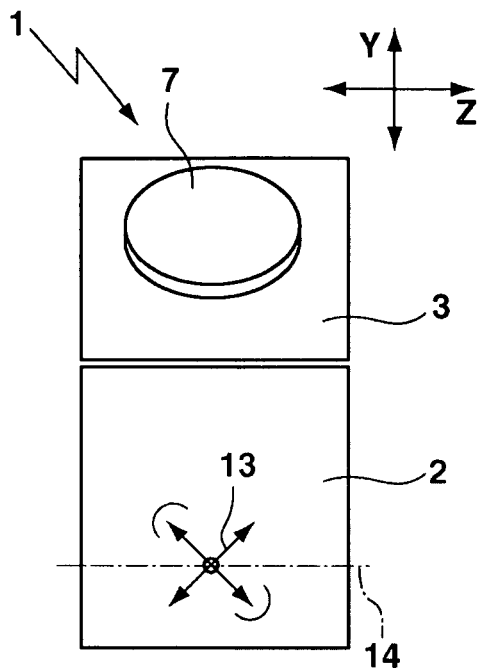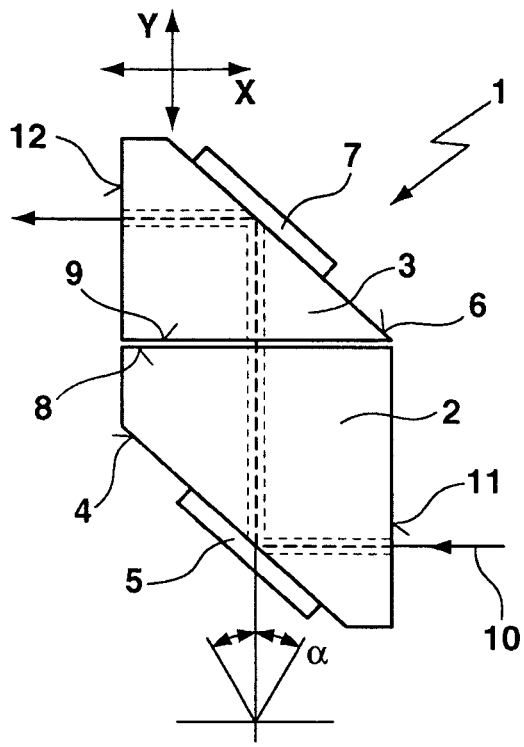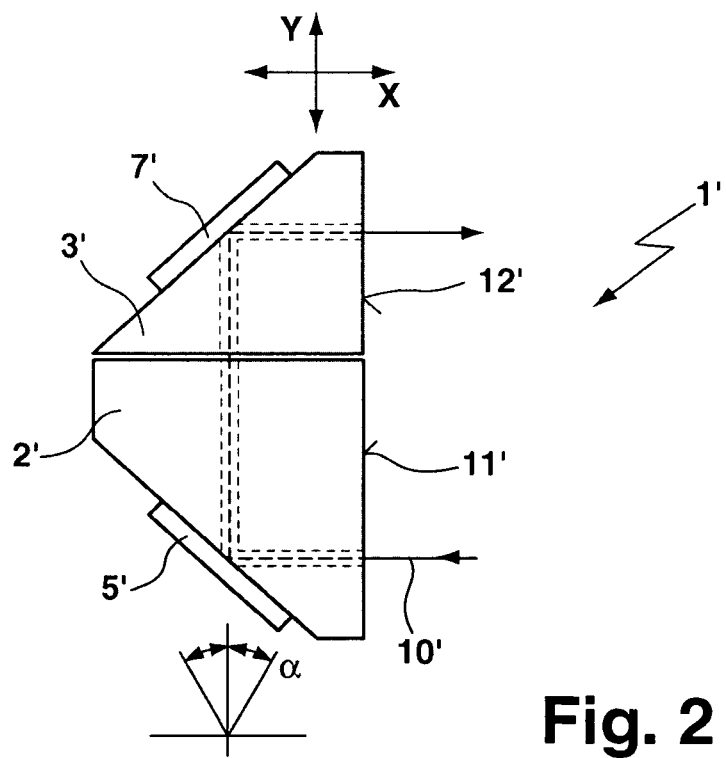
Fig. 1a
Fig. 1b
Fig. 2

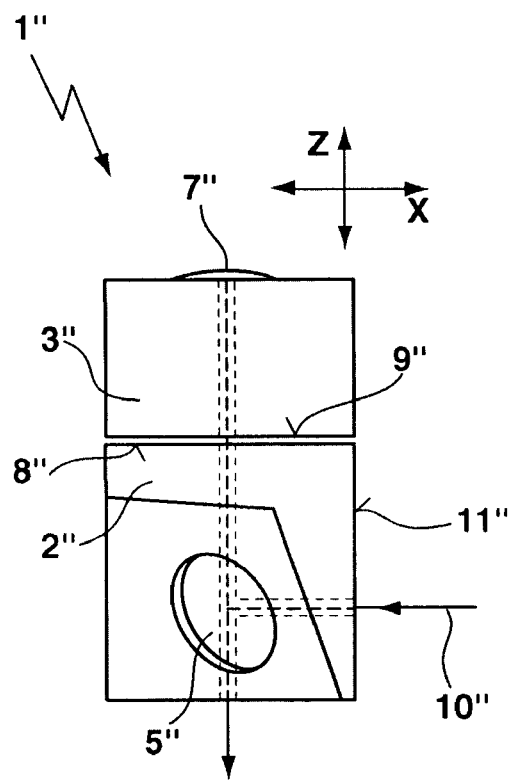
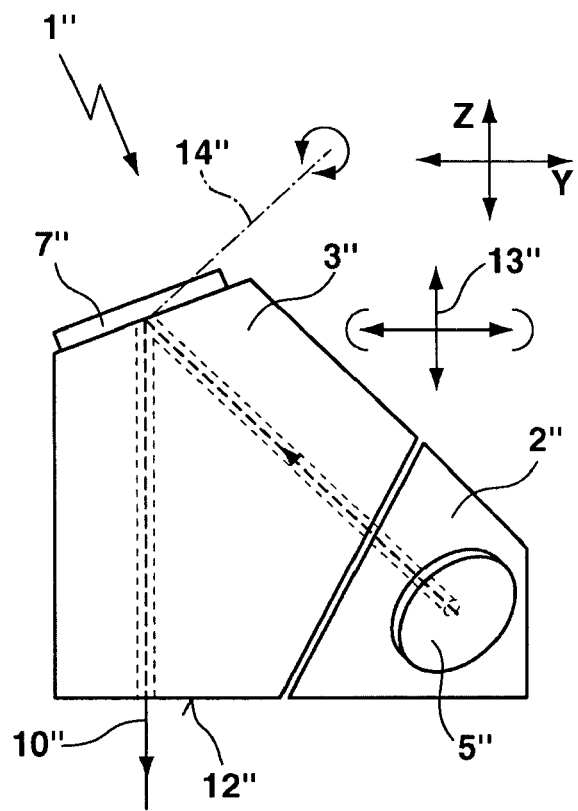
Fig. 3a  Fig. 3b

SYSTEMS FOR INFLUENCING LASER BEAM POLARIZATION

RELATED APPLICATION

Under 35 U.S.C. § 119, this application claims the benefit of a foreign priority application filed in Europe, serial number 05 014 867.5, filed Jul. 8, 2005. The disclosure of the prior application is considered part of and is incorporated by reference in the disclosure of this application.

RELATED APPLICATION

Under 35 U.S.C. § 119, this application claims the benefit of a foreign priority application filed in Europe, serial number 05 014 867.5, filed Jul. 8, 2005. The disclosure of the prior application is considered part of and is incorporated by reference in the disclosure of this application.

The present invention relates to a device for controlling the polarization of laser radiation using a phase-shifting element and an element which deflects the laser radiation.

Direction-independent processing of workpieces during laser cutting requires the laser radiation at the cutting head of laser cutting machines to have a high circular polarization degree. The laser radiation that is emitted from a resonator without using additional optical elements is, however, generally linearly polarized.

DE 31 49 004 A1 discloses conversion of linearly polarized laser radiation into circularly polarized laser radiation by using a λ/4 plate. A phase shift mirror can meet the same function. With an appropriate incidence angle, an ideal phase shift mirror generates a phase shift of 90° between a polarization component (s polarization), which is aligned perpendicularly to an incidence plane, and a polarization component (p polarization) which is aligned parallel to the incidence plane. The incidence plane is a plane which is formed by the surface normal of the phase shift mirror and an incident laser beam. The linear polarization can be converted into circular polarization through a 90° phase shift (and vice versa).

The circularly polarized laser radiation generated using the phase-shifting element is reflected on an element which deflects laser radiation, such as a deflecting mirror, before leaving the device for polarization control. The deflecting mirror usually aligns the laser radiation emitted from the device.

An arbitrary number of beam deflecting elements (mirrors) are provided in the beam trajectory between the laser source and the processing head, wherein the device may be positioned at any location within said beam trajectory. The mirrors often have a dielectric coating to prevent any phase shift during reflection thereon. However, phase shifts cannot be entirely prevented, with the consequence that the laser radiation incident on the cutting head is no longer completely circularly polarized.

DE 4434504 discloses a laser cutting machine, wherein a first deflecting mirror is a circularly polarized phase shift mirror and wherein second to fifth deflecting mirrors are disposed in the path of rays, such that the phase shifts that are specific to deflecting mirrors can be compensated for. Four deflecting mirrors are required to compensate for the phase shifts.

In contrast thereto, it is the object of the present invention to further develop a device of the above-mentioned type in such a manner that phase shifts can be compensated for using a minimum amount of optical elements.

This object is achieved in accordance with the invention with a device of the above-mentioned type, wherein the phase-shifting element is disposed in the region of an outer side of a first partial body, and the deflecting element is disposed in the region of an outer side of a second partial body, wherein the first partial body and the second partial body can be rotated about a common axis of rotation through an angle which can be predetermined. The partial bodies may be solid bodies e.g. of aluminium. having apertures and beam guiding channels, or be transparent bodies.

The inventive device substantially optimizes the circular polarization degree without requiring additional optical elements. In particular, the phase deviations of the upstream and downstream deflecting mirrors (i.e. their sum) can be corrected.

In dependence on the angle at which the laser radiation is incident on the phase-shifting element and on the type of phase shift coating, one obtains a phase shift which converts an incident, linearly polarized laser radiation into an emitted circularly polarized laser radiation. The compensation of the phase shifts of the individual deflecting mirrors, which cause that the laser radiation incident on the cutting head is not completely circularly polarized, is effected by adjusting the angle of rotation of the overall inventive device.

The construction of the device ensures that the directions of incident and emitted laser radiation remain unchanged during rotation. The first partial body is displaced relative to the second partial body to compensate for the beam offset. This ensures that the emitted laser radiation maintains its direction and position even when the polarization is optimized through rotation.

In an advantageous embodiment, the axis of rotation is oriented perpendicularly to a light incidence plane of the phase-shifting element. The light incidence plane is determined by the direction of the incident laser radiation and the direction of the normal of the phase-shifting element. This arrangement of the axis of rotation ensues that, upon reflection, the laser radiation continues to extend in the incidence plane of the phase-shifting element even during rotation about the axis of rotation.

In an advantageous embodiment, the deflecting mirror and the phase-shifting element are arranged in such a manner that the incident and the emitted laser radiation extend in parallel and offset from each other by an amount that can be predetermined.

In a further preferred development of this embodiment, the deflecting mirror and the phase-shifting element are disposed in such a manner that the incident and the emitted laser radiation usually extend in parallel, but opposite directions.

In an alternative embodiment, the deflecting mirror and the phase-shifting element are disposed in such a manner that the emitted laser radiation is deflected through 90° relative to the incident laser radiation.

BRIEF DESCRIPTION OF THE DRAWINGS

The schematic drawing explains three preferred embodiments of the invention.

FIGS. 1a, b show a front view and a side view of a first embodiment of a device for optimizing the polarization, with a deflecting mirror disposed in parallel with a phase shift mirror;

FIG. 2 shows a second embodiment of a device for optimizing the polarization, with a deflecting mirror disposed perpendicularly to a phase shift mirror;

FIGS. 3a, b show a front view and a side view of a third embodiment of a device for optimizing the polarity, with a deflecting mirror which is disposed at an angle relative to a phase shift mirror.

DETAILED DESCRIPTION OF THE DRAWINGS

Figure 4:
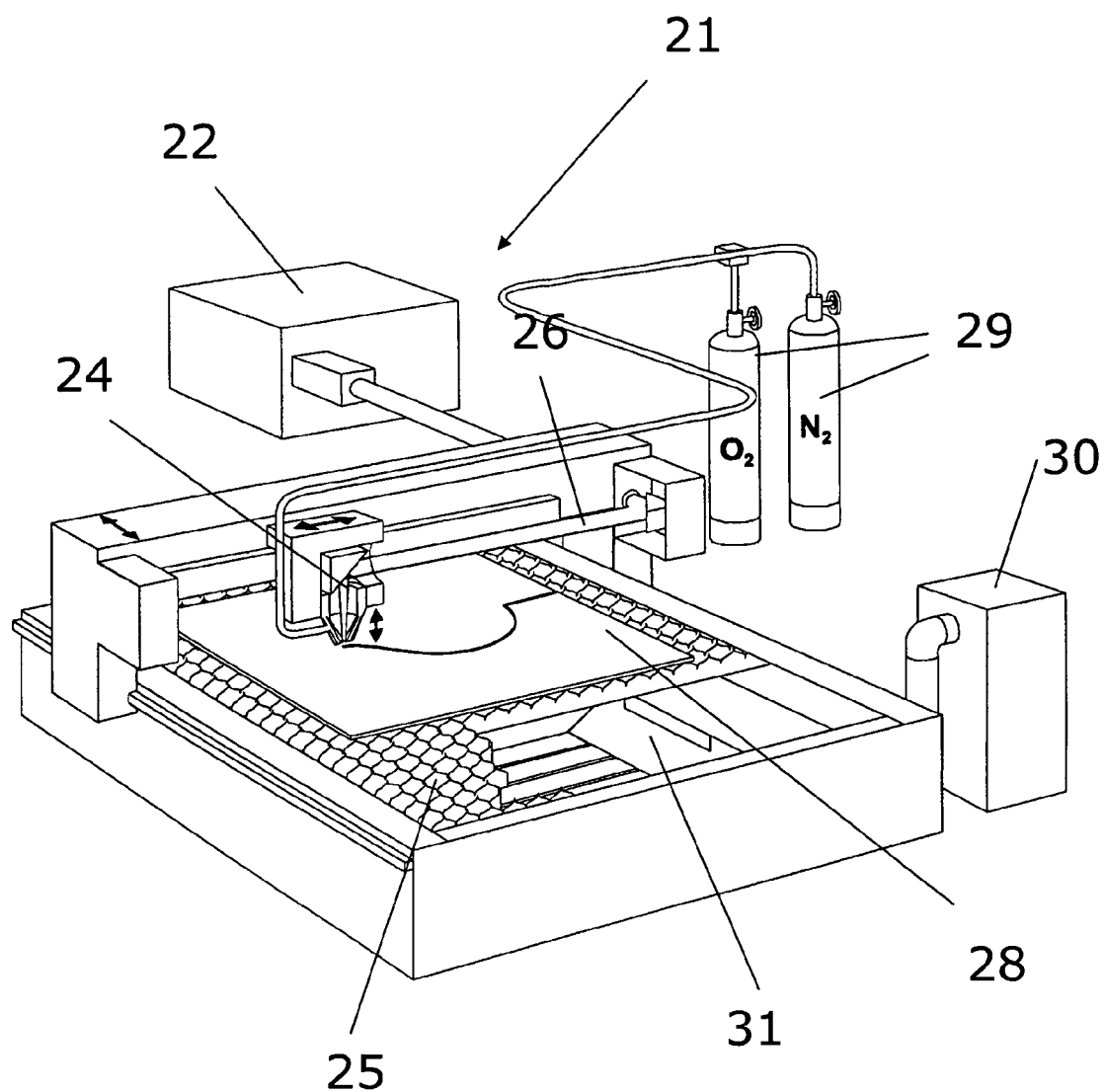
FIG. 4 shows a laser cutting system.

FIG. 1a shows a front view in the (X,Y) plane and FIG. 1b shows a side view in the (Y,Z) plane of the device 1 for controlling the polarization of laser radiation, which can be used in a laser cutting machine shown in FIG. 4. The device 1 has a first partial body 2 and a second partial body 3 with beam guiding channels. The first partial body 2 has a phase shift mirror 5 on an outer side 4 thereof. The second partial body 3 has a deflecting mirror 7 on an outer side 6 thereof. An outer side 8 of the first partial body 2 and an outer side 9 of the second partial body 3 are disposed in such a manner that they can be displaced along a common plane.

A laser beam 10 enters perpendicularly to a beam incidence surface 11 of the first partial body 2 and is deflected on the phase shift mirror 5, which is disposed at an angle of 45° relative to the beam incidence surface, towards the deflecting mirror 7. The laser beam 10 is deflected again through 90° in the (X,Y) plane on the deflecting mirror and is emitted at a right angle through a beam emerging surface 12 of the second partial body 3, which extends parallel to the beam incidence surface 11 and is disposed at an angle of 45° relative to the deflecting mirror 7. The laser beam 10 passes through the device 1, thereby maintaining its direction, but being offset in the Y direction by an amount which is predetermined by the construction of the device 1. The arrangement of deflecting mirror 7 and phase shift mirror 5 relative to the beam direction may also be reversed.

The laser beam 10 of the device shown in FIG. 1 is (largely) linearly polarized with a polarization direction 13 aligned at an angle of 45° relative to the (X,Y) plane, before being reflected on the phase-shift mirror 5. In order to obtain a circular polarization after reflection on the phase shift mirror 5, the amount of the field strengths of the electric light wave of the incident beam perpendicular to the incidence plane (s polarization) must be identical to the amount parallel to the incidence plane (p polarization), which can be ensured through alignment of the polarization direction 13 at an angle of 45° relative to the incidence plane.

The phase shift mirror 5 is disposed at an angle of 45° relative to the incident laser beam 10 and has a phase shifting characteristic which depends on the incidence angle and causes a phase-shift of 90° at an incidence angle of 45°. The device 1 of FIG. 1 therefore converts an incident, linearly polarized laser beam 10 into an emitted circularly polarized laser beam 10 through reflection on the phase shift mirror 5.

It is therefore the underlying purpose of the device 1 to adjust deviations of the laser beam 10, emitted from the device 1, from a circular polarization in such a manner that the circular polarization incident on the laser processing head (laser cutting head) has an optimum quality in combination with the deviations of the other deflecting mirrors of the beam guidance. These deviations may be generated e.g. through phase shifts at the deflecting mirrors. The deviation from the circular polarization on a cutting head of the laser cutting system shown in FIG. 4 can be determined using a suitable optical sensor.

In order to correct the phase errors, the incidence angle at which the laser beam 10 is incident on the phase shift mirror 5 must be changed. This is effected through rotation about an axis of rotation 14 which is aligned perpendicularly to the incidence plane ((X,Y) plane) of the laser beam 10 on the phase shift mirror 5 (i.e. in Z direction). The axis of rotation 14 in FIG. 1 extends below the center of the disc-shaped phase shift mirror 5 but may be displaced to any other location along the Y direction. The axis of rotation must not necessarily extend through the center.

Through rotation about the axis of rotation 14, the entire device 1 is rotated through an angle of rotation α. The rotation changes the incidence angle of the laser beam 10 and thereby the phase shift caused by the phase shift mirror 5, which depends on the type of coating. The required angles of rotation α are estimated to be in a range of less than 2°.

The direction of the laser beam 10 emitted from the device 1 corresponds to its direction of incidence due to the parallel orientation of the phase shift mirror 5 and the deflecting mirror 7. A beam offset beyond the beam offset in the Y direction, as shown in the non-rotated device of FIG. 1, is caused by rotation through the α. This beam offset can be compensated for by displacing the first partial body 2 relative to the second partial body 3 along a plane in the (X,Y) direction formed by the two abutting outer sides 8, 9 of the device 1. This ensures that the polarization is optimized without changing the position and direction of the emitted laser beam 10.

It should also be noted that the beam incidence and emerging directions may be exchanged and the device 1 may also be laterally reversed.

FIG. 2 shows a device 1' which has the same construction and function as the device 1 of FIG. 1. A first partial body 2' has a phase shift mirror 5', and a second partial body 3' has a deflecting mirror 7'. A beam incidence surface 11' of the first partial body 2' and a beam emerging surface 12' of the second partial body 3' are in one common plane. The beam emerging direction of a laser beam 10' leaving the device is thereby opposite to the beam incidence direction.

FIG. 3a shows a front view in the (X,Z) plane and FIG. 3b a side view in the (Y,Z) plane of a device 1" for optimizing the polarization, wherein the beam incidence direction of a laser beam 10" is disposed at a right angle to a beam incidence direction. The laser beam 10" enters a first partial body 2" of the device 1" from the X direction perpendicularly to a beam incidence surface 11" of the first partial body. The laser beam 10" is linearly polarized with a polarization direction 13" in the Z direction before being reflected on a phase shift mirror 5". The laser beam 10" could alternatively also be polarized in the Y direction as is indicated by the double arrow in brackets. The surface normal of the phase shift mirror 5" is turned through an angle of 45° relative to the (Y,Z) plane. The laser beam 10" incident on the phase shift mirror 5" from the X direction is reflected by the latter into the (Y,Z) plane and is incident on a deflecting mirror 7" which is mounted to an outer side of a second partial body 3". The laser beam 10" is deflected in the Z direction by the deflecting mirror 7", whose surface normal is also in the (Y,Z) plane, and is emitted from the device 1" through a beam emerging surface 12" of the second partial body 3".

Analog to FIGS. 1 and 2, rotation is effected through an angle α, about an axis of rotation 14" which is perpendicular to the incidence plane of the phase shift mirror 5", wherein the position of the axis of rotation is not predetermined. The first partial body 2" can be displaced relative to the second partial body 3" in a plane, which is formed by an outer side 8" of the first partial body 2" and a bordering outer side 9" of the second partial body 3", in order to correct a beam offset caused by the rotation through angle α.

It is, of course, also possible to produce devices that adjust a non-circular polarization degree at the cutting head by operating the phase shift mirror at a different incidence angle. The phase shift produced by the deflecting mirrors may initially be adjusted at the start of operation of the laser cutting system using suitable measuring optics provided at the position of the removed cutting head. Alternatively, the measuring result can be used in a control loop to adjust the phase shift, such that phase shifts caused during operation of the laser cutting system, e.g. through temperature variations, can be compensated for. Rotation of the device about the axis of rotation and mutual displacement of the partial bodies is effected using suitable turning units or displacing units which are familiar to the person skilled in the art of optics.

FIG. 4 shows the construction of a laser processing system 21 for laser cutting using a $CO_2$ laser 22, a laser processing head 24 and a workpiece support 25. A generated laser beam 26 is guided to the laser processing head 24 using deflecting mirrors and is directed to a workpiece 28 using mirrors. The inventive device may be installed at any location in the beam guidance of the laser beam 26.

The laser beam 26 must penetrate through the workpiece 28 to produce a continuous kerf. The sheet metal 8 must be melted or oxidised in spots at one location, and the molten mass bust be blown out.

During slow piercing by means of a ramp, the laser power can be gradually increased, reduced or be kept constant for a certain period until the pierced hole has been produced. Piercing and also laser cutting are supported by adding a gas. Oxygen, nitrogen, compressed air and/or application-specific gases may be used as cutting gases 29. The type of gas which is finally used depends on the materials to be cut and on the desired quality of the workpiece.

The material is melted at that location where the laser beam 26 is incident on the sheet metal 28, and is largely oxidised. The produced molten mass is blown out together with the iron oxides. Generated particles and gases can be suctioned out of a suction chamber 31 using a suctioning means 30.

The invention claimed is:

1. A laser radiation polarization controller comprising
   a phase-shifter mounted adjacent an outer side of a first partial body; and
   a radiation deflector mounted adjacent an outer side of a second partial body;
   the first and second partial bodies being rotatable about a common axis of rotation through a predeterminable or selectable angle of rotation;
   wherein the first and second partial bodies have two further outer sides disposed opposite to each other in a displaceable manner to enable correction of a beam offset caused by the rotation through the angle of rotation.

2. The polarization controller of claim 1, wherein the axis of rotation is oriented perpendicularly to a light incidence plane of the phase-shifter.

3. The polarization controller of claim 1, wherein the deflector and the phase-shifter are arranged such that incident and exiting laser radiation extend parallel to each other and offset from each other by a predeterminable or selectable amount.

4. The polarization controller of claim 1, wherein the deflector and the phase-shifter are arranged such that incident and exiting laser radiation extend parallel to each other and in opposite directions.

5. The polarization controller of claim 1, wherein the deflector and the phase-shifter are arranged such that exiting laser radiation is deflected by 90° relative to incident laser radiation.

* * * * *

UNITED STATES PATENT AND TRADEMARK OFFICE
CERTIFICATE OF CORRECTION

PATENT NO. : 7,573,636 B2 Page 1 of 1
APPLICATION NO. : 11/483405
DATED : August 11, 2009
INVENTOR(S) : Christian Boettcher It is certified that error appears in the above-identified patent and that said Letters Patent is hereby corrected as shown below:

Title page, column 2, Section (57) Abstract, line 5, delete "t(7)", insert --(7)--.

Column 1, line 12, delete "RELATED APPLICATION Under 35 U.S.C. § 119, this application claims the benefit of a foreign priority application filed in Europe, serial number 05 014 867.5, filed Jul. 8, 2005. The disclosure of the prior application is considered part of and is incorporated by reference in the disclosure of this application."

Signed and Sealed this

First Day of June, 2010

David J. Kappos
*Director of the United States Patent and Trademark Office*